United States Patent
Hasegawa

[11] Patent Number: 5,856,741
[45] Date of Patent: Jan. 5, 1999

[54] DOUBLE DC-DC CONVERTER HAVING POWER HOLDING PORTION

[75] Inventor: Kazuo Hasegawa, Miyagi-ken, Japan

[73] Assignee: Alps Electric Co., Ltd., Tokyo, Japan

[21] Appl. No.: 864,800

[22] Filed: May 29, 1997

[30] Foreign Application Priority Data

Jun. 4, 1996 [JP] Japan ................................. 8-141789

[51] Int. Cl.$^6$ ................................................. G05F 1/40
[52] U.S. Cl. ........................................... 323/272; 323/266
[58] Field of Search .................................. 323/266, 271, 323/272, 268; 307/64, 82

[56] References Cited

U.S. PATENT DOCUMENTS

| | | | |
|---|---|---|---|
| 3,414,802 | 12/1968 | Harrigan et al. | 363/89 |
| 4,868,908 | 9/1989 | Pless et al. | 323/267 |
| 5,532,576 | 7/1996 | MacRobbie et al. | 323/274 |
| 5,710,699 | 1/1998 | King et al. | 363/132 |

*Primary Examiner*—Shawn Riley
*Attorney, Agent, or Firm*—Brinks Hofer Gilson & Lione

[57] ABSTRACT

Power supply circuitry is disclosed which suppresses changes in a converted voltage regardless of changes in a load state without substantially increasing the volume and weight of the power supply circuitry and raising the manufacturing cost. The circuitry has a direct current power source. A first DC-to-DC converter converts a voltage of the direct current power source. A smoothing filter smoothes the converted voltage of the first DC-to-DC converter and outputs it. The power supply circuitry further includes a power supply section. The power supply section has a voltage detecting portion for detecting a decrease in the converted voltage and outputs a voltage-decrease detection signal. A power holding portion charges capacitor devices with the converted voltage or a voltage of the direct current power source, and discharges the capacitor devices when a voltage-decrease detection signal is output. A second DC-to-DC converter converts an output of the power holding portion and synthesizes the converted output with the converted voltage of the first DC-to-DC converter. A predetermined voltage at which the voltage-decrease detection signal starts to be generated is set lower than the internal control voltage of the first DC-to-DC converter.

4 Claims, 5 Drawing Sheets

DOUBLE DC-DC CONVERTER HAVING POWER HOLDING PORTION

BACKGROUND OF THE INVENTION

1. Field of the Invention

The present invention relates generally to power supply circuitry suitable for supplying driving power to a portable optical mark reader, such as a bar code scanner. More particularly, the invention relates to power supply circuitry which can minimize changes in voltages converted from voltages of a direct current power supply and supplied to a load even though the state of the load is considerably changed.

2. Description of the Related Art

Hitherto, for facilitating the operability of a portable optical mark reader, such as a bar code scanner, to enhance its portability, built-in batteries, such as miniature secondary cells and dry cells, are used as a power supply source. Further, in order to avoid enlargement of such a portable device, the number of built-in secondary cells and dry cells are reduced to a minimal level, and a direct-current-to-direct-current converter (DC-to-DC converter) compensates for shortage of cells and is provided for power supply circuitry to generate a voltage required for driving a load.

Figure 4:
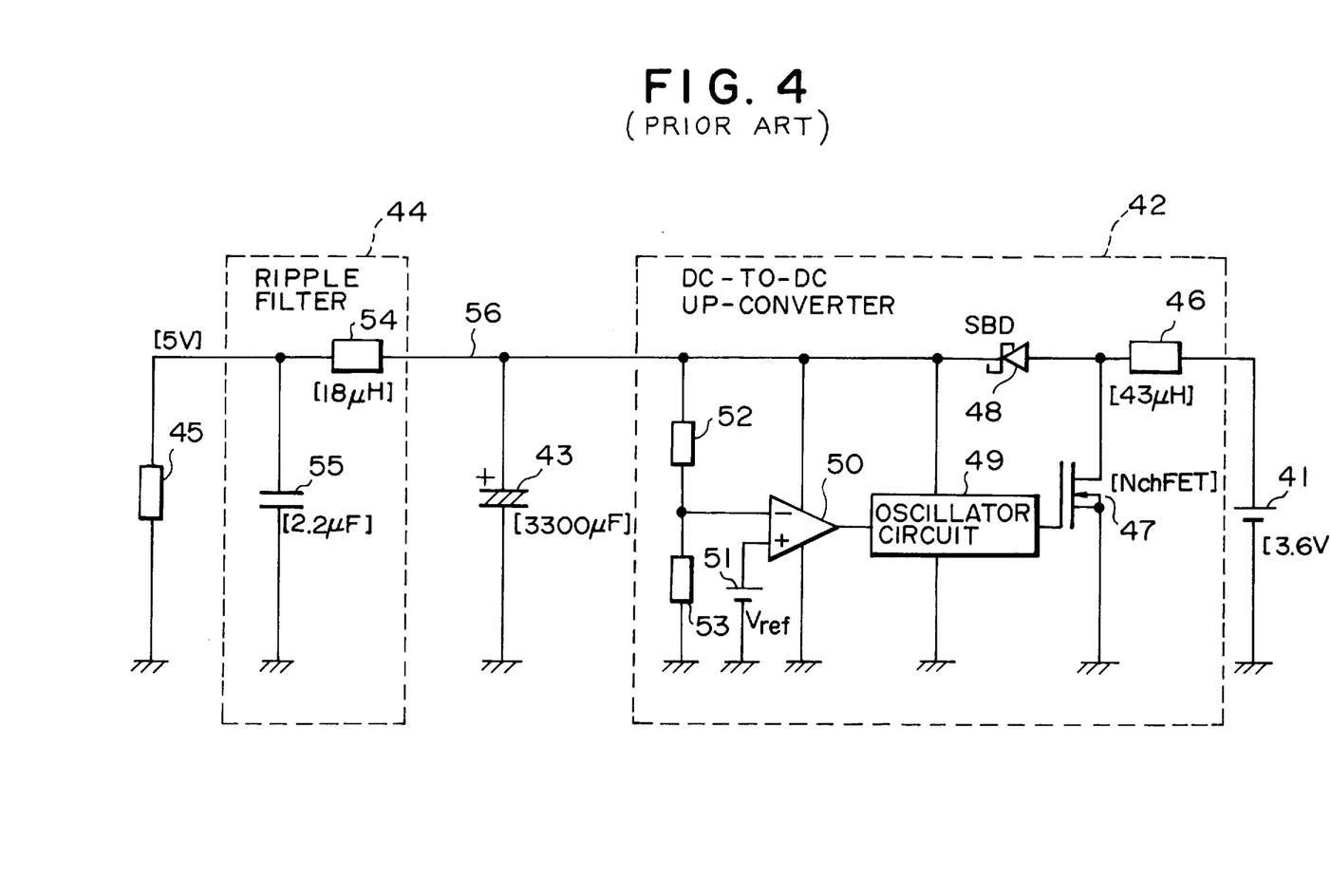
FIG. 4 is a circuit diagram illustrating an example of the configuration of known power supply circuitry used in a portable optical mark reader, such as a bar code scanner.

FIG. 4 is a circuit diagram illustrating an example of the configuration of conventional power supply circuitry for supplying power to a portable optical mark reader, such as a bar code scanner. The power supply circuitry is, as illustrated in FIG. 4, adapted to convert an output voltage of a built-in power supply source 41, such as a miniature secondary cell or dry cell, and to supply driving power to a load 45. The power supply circuitry has a DC-to-DC up-converter 42 for raising an output voltage of the built-in power source 41, a large-capacity shunt capacitor 43, and a ripple filter 44 for eliminating ripple components. The DC-to-DC up-converter 42 is formed of a series inductor 46, a field effect transistor (FET) 47, a Schottky barrier diode (SBD) 48, a self-excited oscillator circuit 49, an operational amplifier (OP) 50, a reference voltage source 51, and resistor dividers 52 and 53. The ripple filter 44 includes a series inductor 54 and a shunt capacitor 55. Moreover, the output terminal of the DC-to-DC up-converter 42, the input terminal of the ripple filter 42, and one end of the shunt capacitor 43 are connected to an output line 56.

A portable optical mark reader, such as a bar code scanner, driven by the aforedescribed power supply circuitry, enters a heavy-load mode and more specifically, the resistance of the optical mark reader is small as viewed from the power supply, when marks are read or the read marks are transmitted in remote control signals, such as light signals. In contrast, the optical mark reader enters a light-load mode, and more specifically, the resistance of the mark reader is large as viewed from the power supply, when in a standby position in which mark reading or remote-control signal transmitting is not performed.

Figure 5:
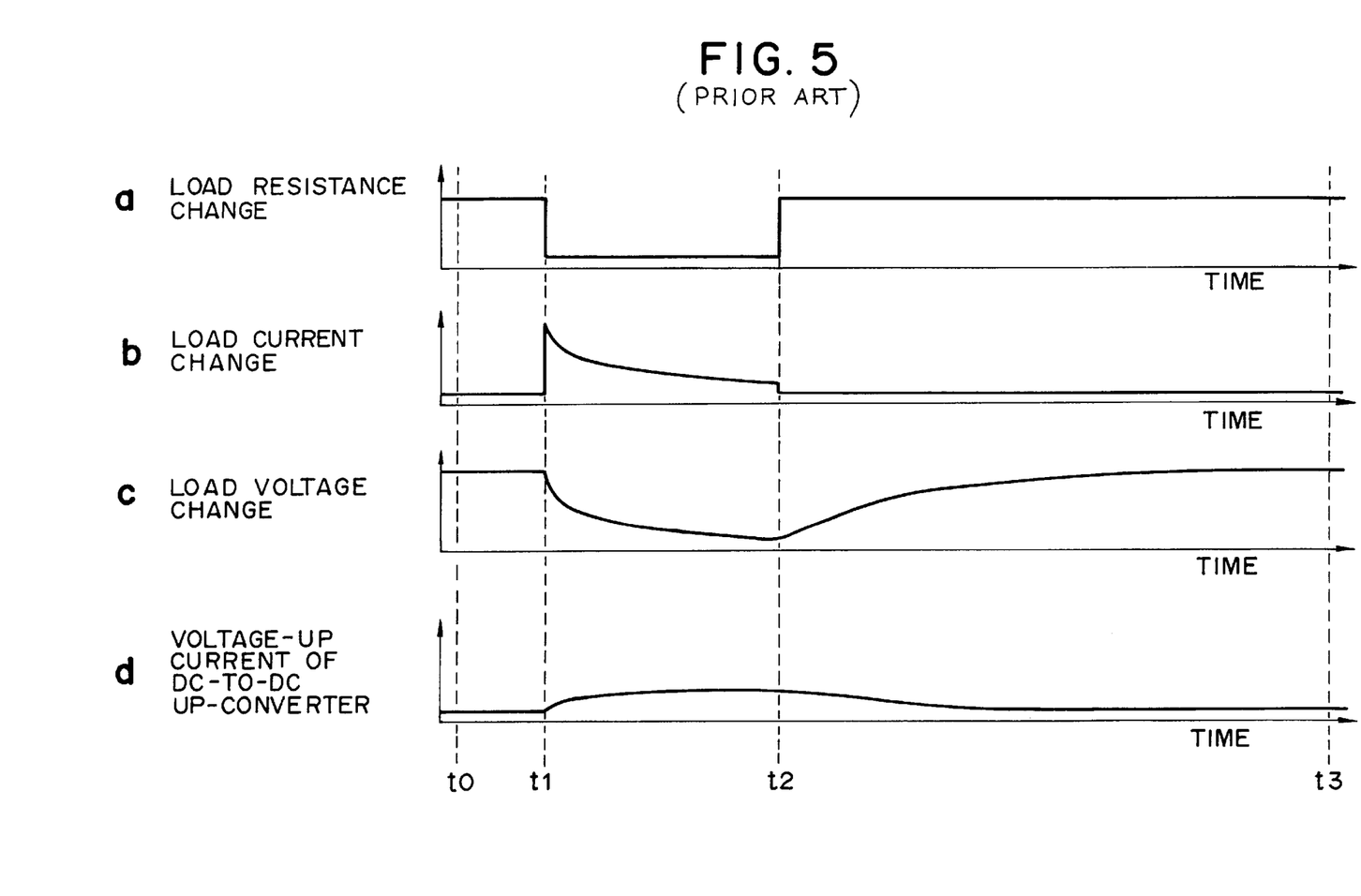
FIGS. 5a through 5d are diagrams illustrating the operations of the individual elements of the known power supply circuitry shown in FIG. 4 when a load state is significantly changed.

FIG. 5 illustrates the operational states of the known power supply circuitry shown in FIG. 4 when the individual factors of the load 45 are significantly changed: FIG. 5a illustrates a change in the resistance (impedance) of the load 45; FIG. 5b illustrates a change in a load current flowing in the load 45; FIG. 5c illustrates a change in a load voltage applied to the load 45; and FIG. 5d is a change in an output current of the DC-to-DC up-converter 42.

The conventional power supply circuitry operates in the following manner when the resistance of the load 45 is large, i.e., under light-load conditions.

In the DC-to-DC up-converter 42, the self-excited oscillator circuit 49 generates a square-wave signal having a predetermined duty cycle and applies it to the gate of the FET 47. When this square-wave signal is at a positive level, the FET 47 is actuated to allow an inductor current $I_L$ to flow from the built-in power supply source 41 via the series inductor 46 and the FET 47, thereby charging the series inductor 46 with energy proportional to the inductor current $I_L$. When the square-wave signal is changed to a negative level, the FET 47 is turned off to discontinue the flow of the inductor current $I_L$. Instead, the charging energy supplied to the series inductor 46 is emitted to the output line 56 via the SBD 48 so as to generate a raised voltage corresponding to the charging energy in the output line 56. The increased voltage is then divided at the resistor dividers 52 and 53 and supplied to the non-inverting input terminal of the operational amplifier 50. In the amplifier 50, the voltage is compared with a reference voltage generated by the reference voltage source 51.

When the raised voltage is within tolerance of a prescribed voltage, the divided voltage fed to the operational amplifier 50 is substantially equal to the reference voltage, and the output of the operational amplifier 50 is a first voltage indicating that there is no difference between the voltages supplied to the two input terminals of the amplifier 50. The self-excited oscillator circuit 49 maintains the above-described predetermined duty cycle of the square-wave signal while the first voltage is being fed to the circuit 49.

If the increased voltage is lower than the tolerance of the prescribed voltage, the divided voltage supplied to the operational amplifier 50 is lower than the reference voltage to create a difference therebetween. The operational amplifier 50 then generates a second voltage obtained by adding a positive voltage equivalent to a difference between the divided voltage and the reference voltage to the first voltage. In response to this second voltage, the oscillator circuit 49 increases the predetermined duty cycle of the square-wave signal. This lengthens the actuation duration and shortens the inactuation duration of the FET 47, which further increases the energy charged to the series inductor 46 and elevates the energy output from the series inductor 46 accordingly. Control is exerted in this manner so that the increased voltage can be contained within the tolerance of the predetermined voltage.

In contrast, if the raised voltage is higher than the tolerance of the predetermined voltage, a divided voltage fed to the operational amplifier 50 is equally higher than the reference voltage to create a difference in a manner similar to the case where the increased voltage is lower than the reference voltage. Thus, the operational amplifier 50 generates a third voltage obtained by adding a negative voltage equivalent to a difference between the divided voltage and the reference voltage to the first voltage. In response to this third voltage, the oscillator circuit 49 decreases the predetermined duty cycle of the square-wave signal. This shortens the actuation duration and lengthens the inactuation duration of the FET 47, which further reduces the energy charged to the series inductor 46 and lowers the energy output from the inductor 46 accordingly. Control is exerted in this manner so that the increased voltage can be contained within the tolerance of the prescribed voltage, in a manner similar to the case where the increased voltage is lower than the prescribed voltage.

During the above-described operation, the increased voltage of the output line 56 is charged by the large-capacitance shunt capacitor 43 and is substantially averaged.

Subsequently, the ripple components contained in the increased voltage are removed by the ripple filter 44, and the resulting voltage is then supplied to the load 45.

An explanation will now be given with reference to FIG. 5 of the operation of the known power supply circuitry when the resistance of the load 45 decreases, i.e., under heavy-load conditions.

During a first period from time $t_0$ to $t_1$, a portable optical mark reader, such as a bar code scanner, is in a standby mode, in which the resistance of the load 45 is large, as shown in FIG. 5a, i.e., under light-load conditions. In this state, a load current is small (minimum), as illustrated in FIG. 5b, while a load voltage is large (maximum), as shown in FIG. 5c. The output current of the DC-to-DC up-converter 42 is small (minimum), as illustrated in FIG. 5d.

At time $t_1$, the portable optical mark reader is caused to transition from the standby mode to a mark reading mode or a remote-control signal transmitting mode. At this time, the resistance of the load 45 is sharply reduced, as shown in FIG. 5a, and the mode is abruptly changed from a light-load mode to a heavy-load mode. The load current is sharply changed from the minimum to a high level (maximum), as illustrated in FIG. 5b, while the load voltage starts to gently decrease from the maximum, as shown in FIG. 5c. The output current of the DC-to-DC up-converter 42 starts to gently increase from the minimum, as illustrated in FIG. 5d. The major portion of the load current at time $t_1$ is discharging current from the shunt capacitor 43.

During a second period from time $t_1$ to $t_2$, the portable optical mark reader is set in the mark reading mode or in the remote-control signal transmitting mode. The resistance of the load 45 is small, as illustrated in FIG. 5a, under heavy-load conditions, while the load current progressively decreases from the high level (maximum), as shown in FIG. 5b. The load voltage progressively decreases, as illustrated in FIG. 5c, and the output current of the DC-to-DC up-converter 42 slightly increases, as shown in FIG. 5d. The load current during the second period initially maintains a comparatively large value because the major portion of the load current is discharging current from the shunt capacitor 43. However, when this discharging current is progressively decreased, the load current is also progressively lowered because a progressive decrease in the discharge current from the shunt capacitor 43 cannot be completely compensated with an increase in the current output from the DC-to-DC up-converter 42.

At time $t_2$, the portable optical mark reader is returned to the standby mode from the mark reading mode or the remote-control signal transmitting mode. At this time, the resistance of the load 45 abruptly increases, as illustrated in FIG. 5a, under light-load conditions. In this state, the load current reduces to a low level (minimum), as shown in FIG. 5b, while the load voltage is caused to transition, as illustrated in FIG. 5c, from a low level to a high level. The output current of the DC-to-DC up-converter 42 starts to gently decrease, as shown in FIG. 5d. The load current at time $t_2$ is part of the output current of the DC-to-DC up-converter 42 because the shunt capacitor 43 has completed discharging.

During a third period from time $t_2$ to $t_3$, the portable optical mark reader is maintained in the standby mode. At this time, the resistance of the load 45 is large, as shown in FIG. 5a, under the light-load conditions. In this state, the load current is maintained at a low level (minimum), as illustrated in FIG. 5b, while the load voltage sequentially increases, as shown in FIG. 5c, to finally return to the high level (maximum). The output current of the DC-to-DC up-converter 42 slightly decreases, as illustrated in FIG. 5d, to finally return to the low level (minimum).

In the aforedescribed known power supply circuitry used in a portable optical mark reader, the DC-to-DC up-converter 42 has a small current-supplying capability, as low as approximately 150 mA, because only a miniature secondary cell or a dry cell is used as the built-in power source. In contrast, the load current intermittently flows with extreme changes (for example, a duty cycle of 1/20 or smaller) by switching between the heavy-load condition and the light-load condition. Accordingly, the average current is 150 mA or smaller, which can be contained within the current-supplying capability of the DC-to-DC up-converter 42. However, the peak load current flowing in a short period of time (for example, 1 millisecond to 100 milliseconds) is approximately 1 A, which far exceeds the current-supplying capability of the DC-to-DC up-converter 42. The above-described operation can be typically observed in power supply circuitry used in a portable optical mark reader as a load. In the aforedescribed known power supply circuitry, when the resistance of the load 45 is considerably changed, the load voltage sharply drops, thereby causing erroneous operation.

Hitherto, for preventing such erroneous operation, means for substantially maintaining the load voltage is provided in response to a significant change in the resistance of the load 45. Among the above known means, the most simple is to increase the capacitance of the shunt capacitor 43, for example, to raise it to approximately 80000 $\mu$F. This is much larger than the averaged load current, which disadvantageously enlarges the volume of the power supply circuitry, thereby increasing the size and weight of the overall portable optical mark reader having the built-in power supply circuitry. Additionally, the manufacturing cost is increased.

Another means for substantially preserving the load voltage is to charge a capacitor under light-load conditions and to discharge the capacitor under heavy-load conditions so as to compensate for a decrease in the load voltage caused by heavy-load conditions with a discharging current generated by the capacitor. An example of such means is disclosed in Japanese Unexamined Patent Publication No. 4-251532.

Although this means can compensate for a decrease in the load voltage under heavy-load conditions, a charging current generated by a capacitor is primarily used to offset the load voltage. Accordingly, a considerably large-capacitance capacitor is required, thus enlarging the volume of the power supply circuitry. This further increases the size and weight of the overall portable optical mark reader having the built-in power supply circuitry. The manufacturing cost is also increased.

SUMMARY OF THE INVENTION

Accordingly, it is an object of the present invention to provide power supply circuitry which effectively suppresses changes in the load voltage regardless of changes in other factors of the load without substantially increasing the volume and weight of the power supply circuitry and raising the manufacturing cost.

In order to achieve the above object, according to one form of the present invention, there is provided power supply circuitry comprising: a first DC-to-DC converter for converting a voltage of a power source and supplying the converted voltage to a load via a smoothing filer, and a power supply section for adding a charging current of a capacitor to the converted voltage only when the converted voltage is lower than tolerance of a prescribed voltage under heavy load conditions. The power supply circuitry further comprises means in which the bottom limit of the tolerance of the prescribed voltage is set lower than the internal control voltage of the first DC-to-DC converter.

In the above-described means, when the load is under light-load conditions, only the first DC-to-DC converter is actuated, and the capacitor of the power supply section is charged with the converted voltage. When the load is changed, however, from light-load conditions to heavy-load conditions, the first DC-to-DC converter is fully operated to output the maximum converted voltage, and a discharging current of the capacitor of the power supply section compensates for shortage of the converted voltage.

With this arrangement, a discharging current supplied from the power supply section can be considerably reduced as compared with the aforedescribed known power supply circuitry, for example, the one disclosed in Japanese Patent Application No. 4-251532. Accordingly, a smaller-capacitance capacitor can be used for the power supply section.

According to another form of the present invention, there is provided power supply circuitry comprising: a direct current power source; a first DC-to-DC converter for converting a voltage of the direct current power source; a smoothing filter for smoothing the converted voltage of the first DC-to-DC converter and outputting it to a load; and a power supply section comprising a voltage detecting portion for detecting a decrease in the converted voltage and outputting a voltage-decrease detection signal, a power holding portion having a capacitor device, for charging the capacitor device with the converted voltage or a voltage of the direct current power source and for discharging the capacitor device when the voltage-decrease detection signal is output, and a second DC-to-DC converter for converting a discharging output of the power holding section when the voltage-decrease detection signal is output and for synthesizing the converted discharging output with the converted voltage of the first DC-to-DC converter, wherein a predetermined voltage at which the voltage-decrease detection signal of the voltage detecting section starts to be generated is set lower than an internal control voltage of the first DC-to-DC converter.

In the above-described power supply circuitry, a current limiter for limiting a charging current of the capacitor device may be provided at the input terminal of the power supply section. The direct current power source may use a battery. Further, the present invention is best suited when a portable optical mark reader, such as a bar code scanner, is used as a load.

The functions of the power supply circuitry according to the present invention are as follows.

Since the converted voltage output from the first DC-to-DC converter is always within tolerance of a prescribed voltage under light load conditions, the voltage detecting section does not generate a voltage-decrease detection signal, thereby preventing the capacitor device from being discharged. At this time, only the first DC-to-DC converter is actuated to output a converted voltage, and the power supply section charges the capacitor device rather than discharging it.

When the load is changed from light-load conditions to heavy-load conditions, the converted voltage of the first DC-to-DC converter decreases to be lower than the tolerance of the prescribed voltage. Accordingly, the voltage detecting section generates a voltage-decrease detection signal, and the capacitor device is discharged and the discharging current is added to the converted voltage. At this time, the first DC-to-DC converter is operated to output the converted voltage, and at the same time, the power supply section outputs a charging current and adds it to the converted voltage of the first DC-to-DC converter.

In the aforedescribed power supply circuitry, a predetermined voltage at which the voltage-decrease detection signal output from the voltage detecting section commences to be generated is set lower than the internal control voltage of the first DC-to-DC converter. Accordingly, the first DC-to-DC converter can be fully operated while the power supply section outputs a charging current of the capacitor device and adds it to the converted voltage. Thus, the discharging current output from the capacitor device of the power supply section can be saved. This further makes it possible to select a smaller-capacitance capacitor device, thereby maintaining the minimal volume and weight of the overall power supply circuitry and containing the manufacturing cost.

DESCRIPTION OF THE PREFERRED EMBODIMENT

An embodiment of the present invention will now be described with reference to the drawings.

Figure 1:
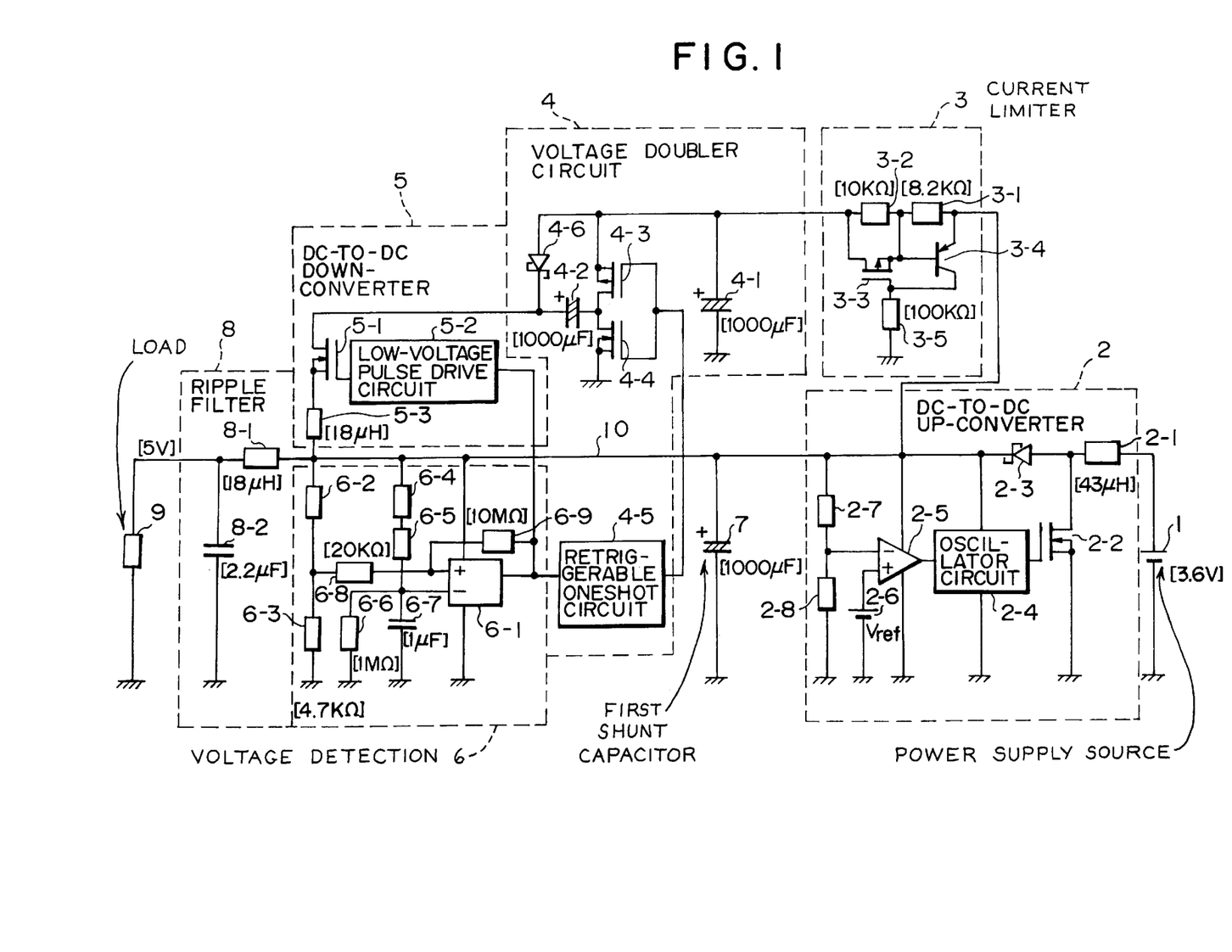
FIG. 1 is a circuit diagram illustrating the configuration of power supply circuitry according to an embodiment of the present invention.

FIG. 1 is a circuit diagram illustrating the configuration of power supply circuitry according to an embodiment of the present invention, the circuit being used for, for example, a portable character mark reader typically represented by a bar code scanner. The power supply circuitry has, as shown in FIG. 1, a built-in power supply source 1, a DC-to-DC up-converter (first DC-to-DC converter) 2, a current limiter circuit (current limiter) 3, a voltage doubler circuit (power holding section) 4, a DC-to-DC down-converter (second DC-to-DC converter) 5, a voltage detection circuit (voltage detector) 6, a first shunt capacitor 7, a ripple filter (smoothing filter) 8, a bar code scanner (load) 9, and an output line 10.

The power supply 1 is formed of one or a small number of miniature secondary cell or dry cell. The DC-to-DC up-converter 2 includes a first series inductor 2-1, a first field effect transistor (first FET) 2—2, a first Schottky barrier diode (first SBD) 2-3, a self-excited oscillator circuit 2-4, an operational amplifier 2-5, a reference voltage source 2-6, and two resistor dividers 2-7 and 2-8. The current limiter circuit 3 has series resistors 3-1 and 3-2, a second field effect transistor (second FET) 3—3, a PNP transistor 3-4, and a bias resistor 3-5. The voltage doubler circuit 4 is formed of a first capacitor 4-1 having a comparatively large capacitance, such as 1000 µF, a second capacitor 4-2 also having a relatively large capacitance, such as 1000 μF, a P-channel field effect transistor (PFET) 4-3, a first N-channel field effect transistor (first NFET) 4—4, a retriggerable oneshot circuit 4-5, and a second Schottky barrier diode (second SBD) 4-6. The DC-to-DC down-converter 5 is constructed of a second N-channel field effect transistor (second NFET) 5-1, a voltage doubler pulse drive circuit 5-2, and a second series inductor 5-3. The voltage detection circuit 6 has a comparator 6-1, a first group of two resistor dividers 6-2 and 6-3, a second group of three resistor dividers 6-4, 6-5 and 6—6, a capacitor 6-7, and hysteresis-forming resistors 6-8 and 6-9. The ripple filter 8 includes a third series inductor 8-1 and a second shunt capacitor 8-2.

The DC-to-DC up-converter 2 is connected at its input terminal to the built-in power supply 1 and at its output terminal to the output line 10 and to the input terminal of the current limiter circuit 3. The voltage doubler circuit 4 is connected at its input terminal to the output terminal of the current limiter circuit 3, at its output terminal to the input terminal of the DC-to-DC down-converter 5, and at its control terminal to the output terminal of the voltage detection circuit 6. The output terminal of the DC-to-DC down-converter 5, the input terminal of the voltage detection circuit 6, and the input terminal of the ripple filter 8 are all connected to the output line 10. The output terminal of the ripple filter 8 is coupled to the load 9.

Figure 2:
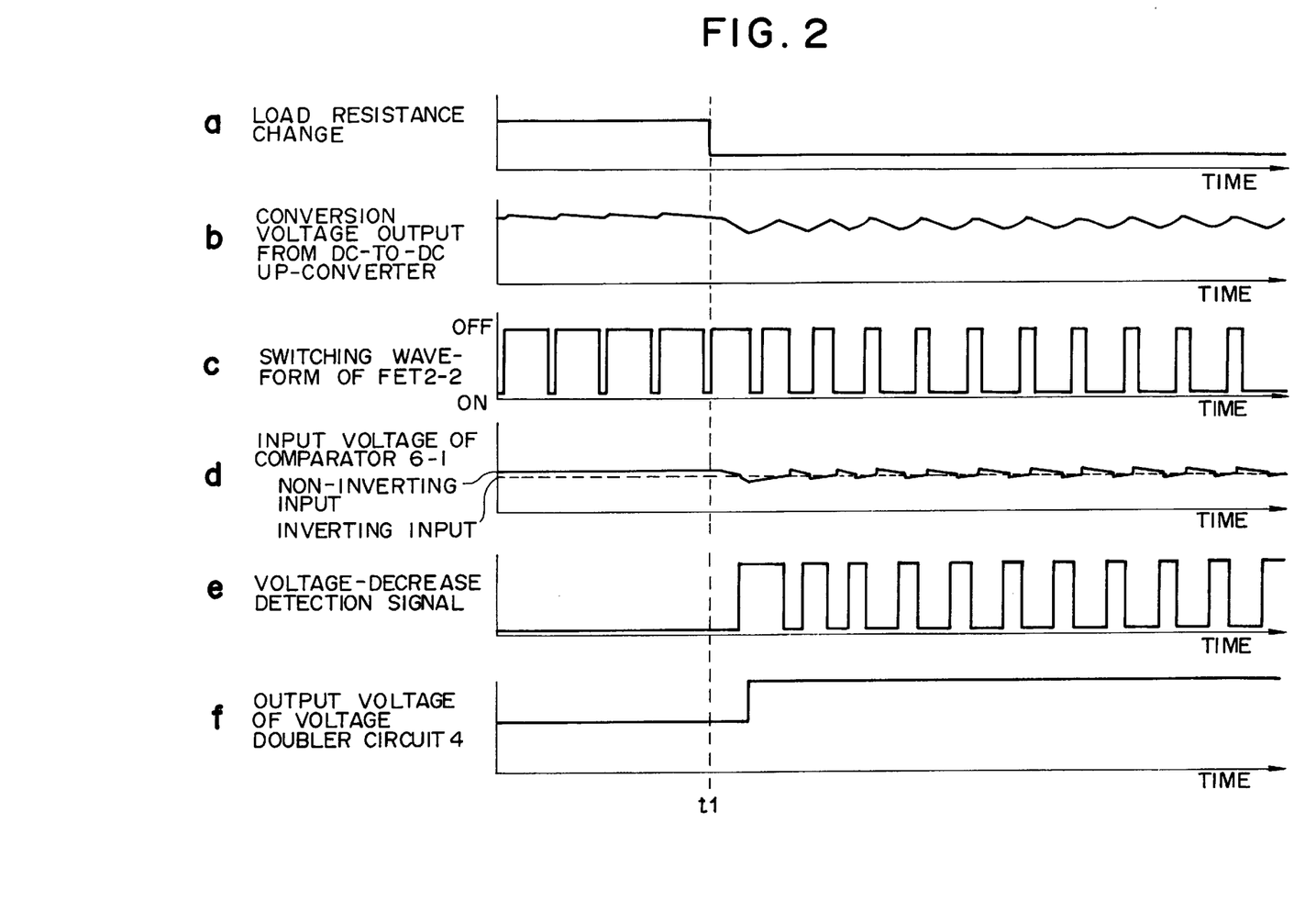
FIGS. 2a through 2f are diagrams illustrating the operations of the individual elements of the power supply circuitry shown in FIG. 1.
Figure 3:
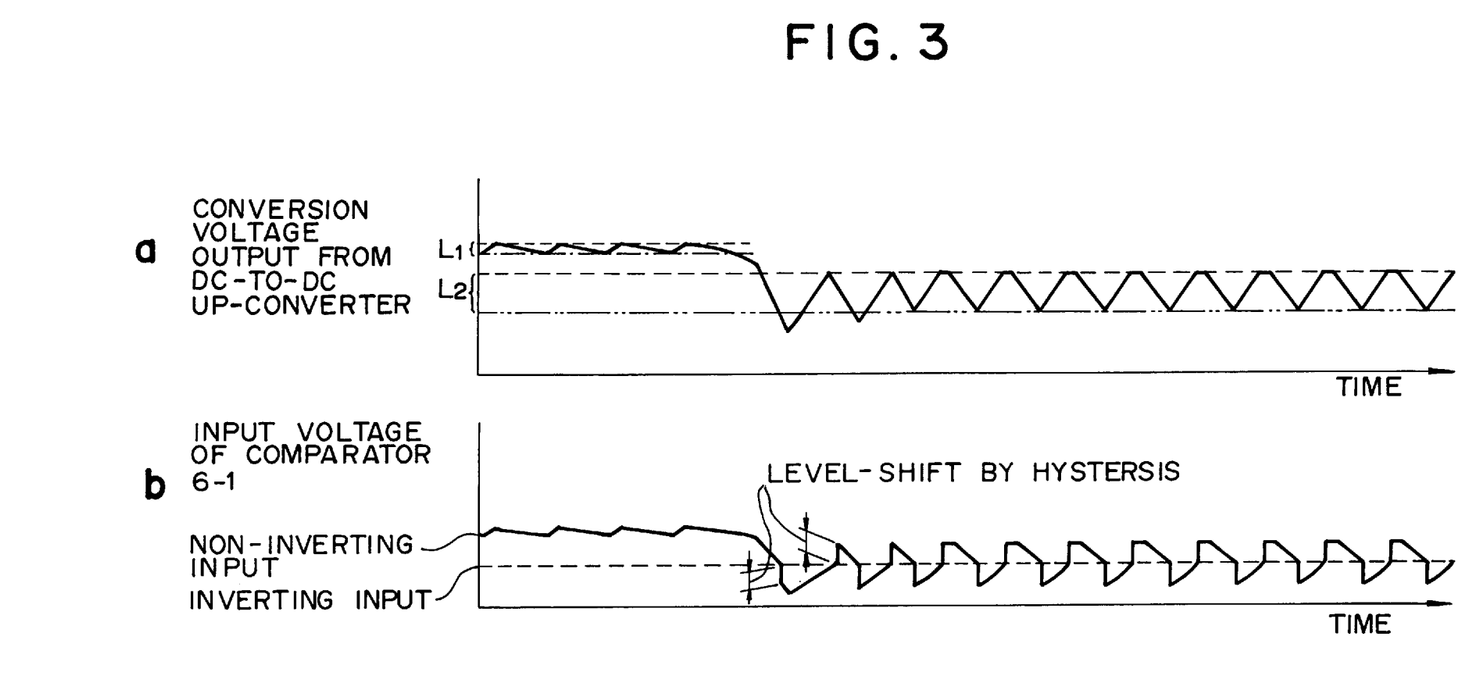
FIGS. 3a and 3b illustrate diagrams partially enlarged from the characteristics shown in FIG. 2.

FIGS. 2a to 2f illustrate the states of the individual elements of the power supply circuitry shown in FIG. 1: FIG. 2a illustrates a change in the resistance of the load 9; FIG. 2b illustrates a converted voltage output from the DC-to-DC up-converter 2; FIG. 2c illustrates a switching waveform of the first FET 2—2 used in the DC-to-DC up-converter 2; FIG. 2d illustrates an input voltage of the comparator 6-1 used in the voltage detection circuit 6; FIG. 2e illustrates a voltage-decrease detection signal output from the comparator 6-1; and FIG. 2f illustrates an output voltage of the voltage doubler circuit 4. FIG. 3 is a diagram partially enlarged from the characteristics shown in FIG. 2: FIG. 3a illustrates a converted voltage output from the DC-to-DC up-converter 2; and FIG. 3b illustrates an input voltage of the comparator 6-1.

An explanation will now be given of the operation of the power supply circuitry of this embodiment while referring to FIGS. 2a through 2f and FIGS. 3a and 3b.

During this operation, the DC-to-DC up-converter 2 increases a voltage of the built-in power supply source 1 and outputs the converted voltage to the output line 10. The up-converter 2 also performs an operation to control the converted voltage in the following manner. Even if the converted voltage in the output line 10 is lower than tolerance $L_1$ of a prescribed voltage of the DC-to-DC up-converter 2, it can be returned to be within the prescribed-voltage tolerance $L_1$. Such a control operation performed by the DC-to-DC up-converter 2 is substantially similar to the operation by the DC-to-DC up-converter 42 (see FIG. 4) used in the known power supply circuitry discussed above, and an explanation thereof will thus be omitted.

Also, during the operation performed by the power supply circuitry, the first shunt capacitor 7 serves to substantially average the converted voltages of the output line 10, while the ripple filter 8 functions to eliminate unwanted components, such as ripples and fluctuations, contained in the converted voltage supplied to the load 9 from the output line 10. These functions are similar to those of the shunt capacitor 43 and the ripple filter 44 (see FIG. 4) used in the known power supply circuitry discussed above. Thus, an explanation of the shunt capacitor 7 and the ripple filter 8 will be omitted.

In FIGS. 2a through 2f and FIGS. 3a and 3b, during a first period prior to time $t_1$, the load 9, for example, a bar code scanner, is in a standby mode in which the resistance of the load 9 is large, as illustrated in FIG. 2a, i.e., under light-load conditions. During a second period subsequent to time $t_1$, the load 9 enters a mark reading mode or a remote-control signal transmitting mode in which the read mark is transmitted in a remote control signal, such as a light signal, and the resistance of the load 9 is small, as shown in FIG. 2a, i.e., under heavy-load conditions.

During the first period, the DC-to-DC up-converter 2 outputs a small-energy converted voltage because the load 9 is under light-load conditions, and the converted voltage oscillates, as illustrated in FIGS. 2b and 3a, within the fluctuation range $L_1$ (the range within the control of the DC-to-DC up-converter 2) in response to the charging/discharging operation performed by the first series inductor 2-1. At this time, in the first FET 2—2 used in the up-converter 2, the switching-on period is, as shown in FIG. 2c, far shorter than the switching-off period. In the comparator 6-1 of the voltage detection circuit 6, as shown in FIGS. 2d and 3b, a converted voltage $V_1$ divided by the first group of resistor dividers 6-2 and 6-3 is supplied to the non-inverting input terminal, while a converted voltage $V_2$ divided by the second group of resistor dividers 6-4 through 6—6 and stabilized by the capacitor 6-7 is fed to the inverting input terminal. Since the converted voltage $V_1$ is larger than $V_2$ throughout the first period, the comparator 6-1 does not output, as illustrated in FIG. 2e, a voltage-decrease detection signal. Further, in the voltage doubler circuit 4, the retriggerable oneshot circuit 4-5 is not triggered since a voltage-decrease detection signal is not generated, which further prevents the generation of an output signal from the circuit 4-5. This turns off the PFET 4-3 and turns on the first NFET 4—4, and the first and second capacitors 4-1 and 4-2 are charged with the converted voltage supplied from the DC-to-DC up-converter 2 via the current limiter circuit 3. Accordingly, the voltage doubler circuit 4 does not generate an output voltage, as shown in FIG. 2f.

During transition from the first period to the second period after time $t_1$, the DC-to-DC up-converter 2 is progressively changed to output a larger-energy converted voltage because the load 9 is changed from light-load conditions to heavy-load conditions. The converted voltage output from the DC-to-DC up-converter 2 sharply drops, as shown in FIGS. 2b and 3a, from the fluctuation range $L_1$ (the range within the control of the up-converter 2), and thereafter, the converted voltage oscillates within a low-level fluctuation range $L_2$ (the range within the control of the DC-to-DC down-converter 5) by operation of the voltage doubler circuit 4 and the DC-to-DC down-converter 5, which will be described in greater detail below. At this time, in the first FET 2-2 used in the up-converter 2, as shown in FIG. 2c, the switching-on period progressively increases, while the switching-off period progressively decreases, and finally, the switching-on period is much longer than the switching-off period. In the comparator 6-1 of the voltage detection circuit 6, as shown in FIGS. 2d and 3b, there is no change concerning the converted voltage $V_1$ being supplied to the non-inverting input terminal, and the converted voltage $V_2$ being fed to the inverting input terminal. Throughout the second period, however, the magnitudes of the converted voltages $V_1$ and $V_2$ are sequentially inverted due to an addition of a voltage to an intermittent converted voltage by the DC-to-DC down-converter 5, which will be discussed below. Then, the comparator 6-1 outputs a voltage-decrease detection signal, as illustrated in FIG. 2e, when the converted voltage $V_2$ is larger than the converted voltage $V_1$. In the voltage doubler circuit 4, the retriggerable oneshot circuit 4-5 is triggered in response to the voltage-decrease detection signal and generates an output signal. This turns on the PFET 4-3 and turns off the first NFET 4—4, and accordingly, charging voltages from the first and second capacitors 4-1 and 4-2 are added in series to each other and are output after a lapse of a predetermined duration subsequent to the start of the second period. Thus, the voltage doubler circuit 4 generates an output voltage, as indicated by FIG. 2f. Moreover, in the DC-to-DC down-converter 5, the voltage doubler pulse drive circuit 5-2 is driven in response to the voltage-decrease detection signal to produce an output signal. This turns on the second NFET 5-1 to regulate the output voltage of the voltage doubler circuit 4 and add it to the converted voltage in the output line 10 when the voltage-decrease detection signal is output. In this manner, the converted voltage can be returned to oscillate within the fluctuation range $L_2$ (the range within the control of the DC-to-DC down-converter 5). An example of the voltage doubler pulse drive circuit 5-2 may be referred to Japanese Patent Application No. 7-47318 submitted by the present inventor.

The power supply circuitry of this embodiment is set so that the range $L_2$ within the control of the DC-to-DC down-converter 5 is lower than the fluctuation range of the converted voltage output from the DC-to-DC converter 2, i.e., the range $L_1$ within the control of the DC-to-DC up-converter 2. To meet this requirement, a predetermined voltage at which the voltage-decrease detection signal starts to be generated is set lower than the internal control voltage of the DC-to-DC up-converter 2.

The two hysteresis-forming resistors 6-8 and 6-9 of the voltage detection circuit 6 are used, as shown in FIGS. 2d and 3b, to level-shift the converted voltage $V_1$ by a predetermined amount when both the converted voltages $V_1$ and $V_2$ become the same level. This can prevent unstable comparison in the vicinity of the level at which converted voltages $V_1$ and $V_2$ coincide with each other. Alternatively, in place of providing the two hysteresis-forming resistors 6-8 and 6-9 (in this case, the resistor 6-8 is short-circuited, while the resistor 6-9 is opened) for the voltage detection circuit 6, the operating frequency of the DC-to-DC up-converter 2 and the inductance of the second series inductor 5-3 used in the DC-to-DC down-converter 5 and the capacitance of the first shunt capacitor 7 may be suitably selected, thereby fulfilling a function similar to the hysteresis-forming resistors 6-8 and 6-9.

According to the power supply circuitry of this embodiment, a predetermined voltage at which the voltage-decrease detection signal commences to be generated is set lower than the internal control voltage of the DC-to-DC up-converter 2. Thus, the DC-to-DC up-converter 2 can be fully operated while charging voltages of the capacitor devices 4-1 and 4-2 of the voltage doubler circuit 4 are discharged and added to the converted voltage. This can equal the discharging current output from the capacitor devices 4-1 and 4-2, thereby enabling the devices 4-1 and 4-2 to add the discharging voltages to the converted voltage for a longer period of time.

Further, the power supply circuitry of this embodiment makes it possible to select comparatively small-capacitance capacitor devices 4-1 and 4-2. This can substantially maintain the volume and weight of the overall power supply circuitry, and the manufacturing cost is not significantly increased.

Although in this embodiment the DC-to-DC up-converter 2 is used as the first DC-to-DC converter, this is not exclusive. The following modification may be considered by way of example: power supplied from an interface with external devices may be saved little by little and utilized when a load requires a current. In this case, if the voltage of the interface is higher than the power supply circuitry, a DC-to-DC down-converter may be employed. When a DC-to-DC down-converter is used, it would be more efficient to utilize a voltage of the power supply source 1 rather than the converted voltage output from the down-converter in order to charge the capacitor devices 4-1 and 4-2 of the voltage doubler circuit 4.

Moreover, in this embodiment, the limiter circuit 3 for limiting the charging current is connected to the input terminal of the voltage doubler circuit 4. However, the limiter circuit 3 is not essential and may be omitted.

Additionally, although this embodiment has been explained in which the load 9 is a bar code scanner, this is not exclusive. The power circuitry of this invention may be applicable to other types of portable optical mark readers similar to the bar code scanner, and portable-type systems whose operating impedances greatly differ between the operating mode and the non-operating (standby) mode.

As is seen from the foregoing description, the present invention offers the following advantages.

When a converted voltage significantly drops due to a considerable reduction in load resistance, the power holding section and the DC-to-DC down-converter are actuated in response to a voltage-decrease detection signal generated by the voltage detecting section. In the power holding section, the capacitor devices charged with the converted voltages so far are discharged to generate a voltage higher than the converted voltage. In contrast, in the DC-to-DC down-converter, the generated higher voltage is regulated and then added to the converted voltage. Thus, an abrupt drop in the converted voltage can be suppressed in a short period of time, and the converted voltage can be maintained at a substantially constant level regardless of load conditions, i.e., heavy or light conditions. This can further prevent erroneous operation of the power supply circuitry caused by a significant drop in the converted voltage.

Further, a predetermined voltage at which the voltage-decrease detection signal starts to be generated in the voltage detecting section is set lower than the internal control voltage of the first DC-to-DC converter. Accordingly, the first DC-to-DC converter can be fully operated while the charging voltages of the capacitor devices used in the power supplying section are discharged and added to the converted voltage. This can save discharging current output from the capacitor devices, thereby enabling the capacitor devices to continue to supply voltages to be added to the converted voltage for a longer period of time. Additionally, comparatively small-capacitance capacitor devices can be selected to maintain a minimal volume and weight of the overall power supply circuitry. The manufacturing cost can also be contained.

What is claimed is:

1. A double DC—DC converter having a power holding portion, comprising:
    a direct current power source;
    a first DC-to-DC converter for converting a voltage of said direct current power source by stepping up the voltage;
    a smoothing filter for smoothing the converted voltage of said first DC-to-DC converter and outputting it to a load; and a power supply section comprising a voltage detecting portion for detecting a decrease in the converted voltage and outputting a voltage-decrease detection signal, a power holding portion having a capacitor device, for charging said capacitor device with the converted voltage or a voltage of said direct current power source and for discharging said capacitor device by stacking said capacitor device on the converted voltage when the voltage-decrease detection signal is output, and a second DC-to-DC converter for converting a discharging output of said power holding section when the voltage-decrease detection signal is output and for synthesizing the converted discharging output with the converted voltage of said first DC-to-DC converter, wherein a predetermined voltage at which the voltage-decrease detection signal of said voltage detecting section starts to be generated is set lower than an internal control voltage of said first DC-to-DC converter.

2. Power supply circuitry according to claim 1, wherein said power supply section comprises a current limiter for limiting a charging current of said capacitor device, said limiter being disposed at the input terminal of said power supply section.

3. Power supply circuitry according to claim 1, wherein said direct current power source comprises a battery.

4. Power supply circuitry according to claim 1, wherein said load comprises a portable optical mark reader including a bar code scanner.

\* \* \* \* \*